United States Patent Office 3,509,137
Patented Apr. 28, 1970

3,509,137
3β,5,6 - TRIHYDROXY - 6 - HYDROXYMETHYL-
PREGNAN-20-ONE, DERIVATIVES THEREOF
AND INTERMEDIATES THERETO
Leonard N. Nysted, Highland Park, Ill., assignor to G. D.
Searle & Co., Chicago, Ill., a corporation of Delaware
No Drawing. Filed Oct. 17, 1968, Ser. No. 768,528
Int. Cl. C07c 169/32, 173/00
U.S. Cl. 260—239.55          10 Claims

ABSTRACT OF THE DISCLOSURE

The reaction of 5α-hydroxy-6-oxo steroids with dimethylsulfoxonium methylide affords the corresponding 5α,6α-epoxy - 6β - hydroxymethyl derivatives which are cleaved by means of a suitable acid or alkaline reagent to yield the 5,6-dihydroxy-6-hydroxymethyl compounds. The latter substances display useful pharmacological properties, e.g. pepsin-inhibitory and anti-protozoal.

---

The present invention is concerned with novel chemical compounds belonging to the pregnane family of steroids and characterized by a 5,6-dihydroxy-6-hydroxymethyl/acyloxymethyl structure and with the 5α,6α-epoxy - 6β - hydroxymethyl/acyloxymethyl precursors thereof. Those 5,6-diols are represented by the following structural formula

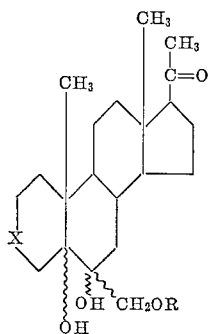

wherein X can be a carbonyl, β-hydroxymethylene or β-hydrocarbonoxymethylene group in which the hydrocarbon moiety is readily removed, e.g. benzyl, and R can be hydrogen or a lower alkanoyl radical.

Examples of the lower alkanoyl radical encompassed by the R term are formyl, acetyl, propionyl, butyryl, valeryl, caproyl, heptanoyl and the branched-chain groups isomeric therewith.

The compounds of this invention are conveniently manufactured by a process which involves cleavage of the 5α,6α-epoxy ring of the novel intermediates represented by the following structural formula

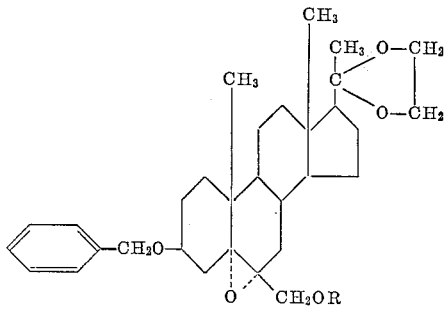

wherein R is hydrogen or a lower alkanoyl radical. That cleavage is effected by reaction with a suitable acidic reagent such as perchloric acid, acetic acid, periodic acid, sulfuric acid, boron trifluoride or acid-washed alumina.

A specific example is the reaction of 6β-acetoxymethyl-3β-benzyloxy-5α,6α-epoxypregnan - 20 - one 20-ethylene ketal, obtained by acetylation of the corresponding 6β-hydroxymethyl compound, with perchloric acid in aqueous acetone, thus producing a mixture of the epimeric 5,6-diols, which are separated by crystallization to yield 6β - acetoxymethyl - 3β - benzyloxy - 5α,6α - dihydroxypregnan-20-one and 6α-acetoxymethyl-3β-benzyloxy - 5α, 6β-dihydroxypregnan-20-one.

The instant 3β-hydroxy compounds are readily obtained by removal of the benzyl group of the aforementioned 3β-benzyloxy substances. Catalytic hydrogenolysis provides a particularly convenient method and palladium is a preferred catalyst. 6α-acetoxymethyl-3β-benzyloxy-5α,6β-dihydroxypregnan-20-one in aqueous acetic acid is thus shaken with 5% palladium-on-carbon catalyst in a hydrogen atmosphere at atmospheric pressure and room temperature to afford 6α-acetoxymethyl - 3β,5α - 6β-trihydroxypregnan-20-one.

The 3-keto compounds of this invention are conveniently produced by reaction of the corresponding 3β-hydroxy substances with a suitable oxidizing agent. 6α-acetoxymethyl - 3β,5α,6β - trihydroxypregnan-20-one in acetone is thus contacted with aqueous chromic acid to yield 6α-acetoxy-5α,6β-dihydroxypregnane-3,20-dione.

The 5,6-dihydroxy compounds of this invention display valuable pharmacological properties as illustrated by their ability to inhibit the enzymatic action of pepsin and also their ability to inhibit the growth of microorganisms such as the protozoan *Tetrahymena gelleii*.

The pepsin-inhibitory property of the instant compounds is specifically illustrated by the activity of 6α-acetoxymethyl - 3β,5α,6β - trihydroxypregnan-20-one and 6α-hydroxymethyl - 3β,5α,6β - trihydroxypregnan-20-one when tested in the following assay:

The technique employed is a modification of that described by M. L. Anson in J. Gen. Physiol., 22, 79 (1938) and is dependent upon the fact that the proteolysis of hemoglobin results in liberation of peptides containing tyrosine and tryptophane units characterized by an absorption band in the ultraviolet spectrum at 275 millimicrons. Absorption at this wave length serves therefore as an index of the extent to which the proteolysis has occurred. Each test is carried out in 4 test tubes to which are added solutions, measured in ml., of hemoglobin, pepsin, compound, hydrochloric acid and perchloric acid. The additions are made immediately before and immediately after simultaneous incubation at 37° in accordance with the schedule shown in Table I.

TABLE I

| Test tube No. | Additions at 0 time | | | | Additions after 2 hours at 37° | | |
|---|---|---|---|---|---|---|---|
| | Hgb | Pep | Cpd | HCl | Cpd | HCl | HClO₄ |
| 1 | 5 | 1 | | 1 | 1 | | 1 |
| 2 | 5 | 1 | | 1 | 1 | | 1 |
| 3 | 5 | 1 | 1 | | | 1 | 1 |
| 4 | 5 | 1 | 1 | | | 1 | 1 |

The hemoglobin solution (Hgb) is prepared by mixing 60 g. of Hemoglobin Substrate Powder (bovine) [Worthington Biochemical Corporation, Freehold, N.J.] with 2000 ml. of double distilled water, successively filtering and centrifuging the resulting slurry, adjusting the pH of the saturated solution thus separated to 2.0 with 6 N hydrochloric acid, and finally diluting with an equal volume of pH 2.0 hydrochloric acid, prepared as described below. The pepsin solution (Pep) is prepared by dissolving 4.0 mg. of 3X Crystallized Pepsin (hog) [Pentex, Incorporated, Kankakee, Ill.] in 200 ml. of pH 2.0 hydrochloric acid and diluting 6.25 ml. of the resulting solution with a further quantity of pH 2.0 hydrochloric acid q.s. 25 ml. The compound solution (Cpd) is prepared by mixing 5 mg. of compound with 5.0 ml. of pH 2.0 hydrochloric acid and filtering out any material which remains insoluble. The hydrochloric acid solution (HCl) is prepared by diluting concentrated hydrochloric acid to pH 2.0 with double distilled water. The perchloric acid is prepared by diluting concentrated perchloric acid with double distilled water q.s. 20% by volume. When the additions after incubation have been completed, the contents of each tube is filtered to remove undigested protein precipitated by the perchloric acid (which also serves to inactivate the enzyme), 1 ml. of each filtrate is diluted with 10 ml. of pH 5 sodium acetate buffer and the resulting solutions are subjected to U.V. spectrophotometric analyses whereby the absorptions at 275 millimicrons are determined. Among the four values thus obtained for each compound tested those deriving the tube numbers 1 and 2 serve as controls, being representative of absorption due to peptides produced by incubation of uninhibited enzyme and substrates superimposed upon absorption due to compound itself, whereas those deriving from tube numbers 3 and 4—so called "treats"—represent absorption due to peptides produced by incubation of enzyme and substrate in the presence of compound, superimposed upon absorption due to compound itself. A compound is considered pepsin-inhibiting if the mean treat value (treat) is significantly ($P \leq 0.05$, Student's t-test) less than the mean control value (control) therefore. Pepsin is known to play a causal role in the production of peptic ulcer.

Illustrative of the anti-protozoal property of these compounds is the activity of 6α-acetoxymethyl-3β-benzyloxy-5α,6β-dihydroxypregnan - 20 - one and 6α-acetoxymethyl-3β,5α,6β - trihydroxypregnan-20-one when tested in the following assay:

A sterile nutrient medium composed of 12 g. of proteose peptone, 8 g. of sucrose and 1000 ml. of distilled water is inoculated with a viable axenic culture of *Tetrahymena gelleii*, then is incubated at room temperature for 24 hours. At the end of that time a 0.5 ml. quantity is transferred aseptically to a test tube containing approximately 5 mg. of the test compound. A test tube containing the culture alone serves as a control. The tubes are incubated at room temperature for 24 hours, then are examined microscopically in order to determine the degree of growth of the microorganisms. A compound is considered active if it results in a definite inhibition of growth as compared to the control.

The invention will appear more fully from the examples which follow. These examples are given by way of illustration only and are not to be construed as limiting the invention either in spirit or in scope as many modifications both in materials and methods will be apparent to those skilled in the art. Temperatures are given in degrees centigrade (° C.) and quantities of materials in parts by weight except where otherwise noted.

EXAMPLE 1

A 50% sodium hydride in mineral oil suspension in the amount of 7.2 parts is washed several times with hexane in order to remove the oil and the sodium hydride thus obtained is dried, then mixed thoroughly with 32.8 parts of trimethylsulfoxonium iodide. The temperature of that mixture is then lowered to approximately —15° and 170 parts by volume of dimethylsulfoxide is added, cautiously at first, with stirring. After completion of the addition, the mixture is warmed to room temperature and stirred for about 30 minutes. The temperature is again lowered to approximately —15° and 35 parts of 3β-benzyloxy-5α-hydroxypregnane-6,20-dione 20-ethylene ketal is added. The temperature of the reaction mixture is allowed to rise to approximately 25°, then is stirred for approximately 24 hours. Dilution of that mixture with approximately 1000 parts of water results in precipitation of the solid product, which is collected by filtration, then extracted into methylene chloride. The organic solution thus obtained is filtered through a mixture of sodium sulfate and diatomaceous earth, then is diluted with hot hexane and partially concentrated. Cooling of the mixture results in crystallization of the pure product, which is collected by filtration, washed on the filter with hexane and dried to afford 3β-benzyloxy-5α,6α-epoxy - 6β - hydroxymethylpregnan-20-one 20-ethylene ketal, melting at about 150–152° and displaying an infrared absorption maximum at about 2.9 microns and also nuclear magnetic resonance peaks at about 42.5 62.5, 76, 111, 216, 234, 272 and 438 cycles per second. It is represented by the following structural formula:

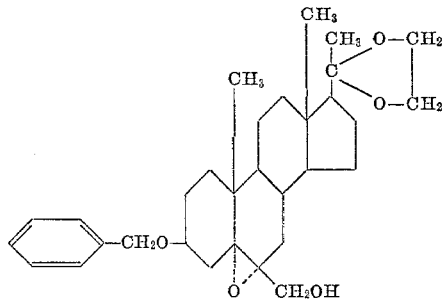

EXAMPLE 2

To a mixture of 30 parts of pyridine and 30 parts of acetic anhydride is added 15 parts of 3β-benzyloxy-5α,6α-epoxy - 6β - hydroxymethylpregnan-20-one 20-ethylene ketal and the resulting reaction mixture is stored at room temperature for about 24 hours. Dilution of the mixture with water results in precipitation of the solid product, which is isolated by filtration, then washed with water on the filter and dried. The resulting 6β-acetoxymethyl-3β-benzyloxy - 5α,6α -epoxypregnan-20-one 20-ethylene ketal exhibits an infrared absoption maximum at about 5.72 microns and nuclear magnetic resonance peaks at about 42.5, 62.5, 76, 123, 233, 243, 272 and 438 cycles per second. It is represented by the following structural formula:

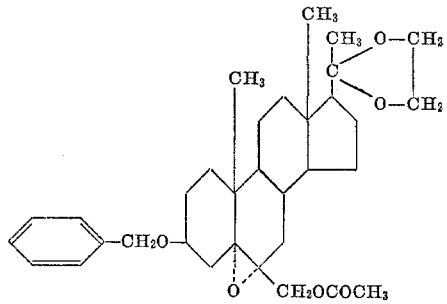

EXAMPLE 3

When an equivalent quantity of propionic anhydride is substituted in the procedure of Example 2, there is produced 3β - benzyloxy - 5α,6α-epoxy-6β-propionoxymethyl-pregnan-20-one 20-ethylene ketal.

EXAMPLE 4

To a solution of 10 parts of 6β-acetoxymethyl-3β-benzyloxy-5α,6α-epoxypregnan-20-one 20-ethylene ketal in 80 parts of acetone is added, with stirring, 2 parts by volume of 60% aqueous perchloric acid dissolved in 10 parts of water. The reaction mixture is stirred at room temperature for about 30 minutes, at the end of which time an additional 10 parts of water is added. After stirring for an additional 3 hours, a further 10 part quantity of water is added and stirring is continued for 21 hours longer. At the end of that time the mixture is concentrated under reduced pressure to remove the majority of the organic solvent and approximately 200 parts of water is added. The resulting precipitated solid is collected by filtration, washed on the filter with water and dried to afford 6 - acetoxymethyl-3β-benzyloxy-5,6-dihydroxypregnan-20-one 20-ethylene ketal. Recrystallization of that epimeric mixture from chloroform-hexane affords 6α-acetoxymethyl-3β-benzyloxy-5α,6β-dihydroxypregnan-20-one, melting at about 171–173° and displaying infrared absorption peaks at about 2.88, 5.8 and 5.9 microns and also nuclear magnetic resonance peaks at about 38, 73, 126, 250, 254, 282.5 and 438 cycles per second. This compound is represented by the following structural formula:

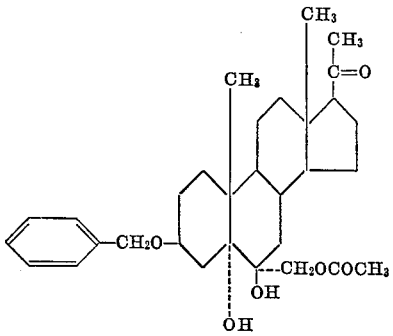

Further recrystallization from chloroform-hexane of the material obtained from the aforementioned chloroform-hexane filtrate results in 6β-acetoxymethyl-3β-benzyloxy-5α,6α-dihydroxypregnan-20-one.

EXAMPLE 5

When an equivalent quantity of 3β-benzyloxy-5α,6α-epoxy - 6β - propionoxymethylpregnan-20-one 20-ethylene ketal is substituted in the procedure of Example 4, there are produced 3β - benzyloxy-5α,6β-dihydroxy-6α-propionoxymethylpregnan-20-one and 3β-benzyloxy-5α,6α-dihydroxy-6β-propionoxymethylpregnan-20-one.

EXAMPLE 6

A mixture containing 20 parts of 6α-acetoxymethyl-3β-benzyloxy-5α,6β-dihydroxypregnan-20-one, 2 parts of 5% palladium-on-carbon catalyst and 250 parts by volume of 5% aqueous acetic acid is shaken in an atmosphere of hydrogen at atmospheric pressure and room temperature until one molecular equivalent of hydrogen is absorbed. At the end of that reaction period the catalyst is removed by filtration and the filtrate is concentrated to an oil under reduced pressure. Crystallization of that oil from ether affords a solid product, which is further purified by recrystallization from chloroform-ether-ethyl acetate, thus producing 6α-acetoxymethyl-3β,5α,6β-trihydroxypregnan-20-one, melting at about 193–195°. This compound exhibits infrared absorption maxima at about 2.85, 2.95 and 5.71 microns and also nuclear magnetic resonance peaks at about 48, 73, 127, 142, 250 and 255 cycles per second. It is represented by the following structural formula:

EXAMPLE 7

The substitution of an equivalent quantity of 3β-benzyloxy - 5α,6β - dihydroxy-6α-propionoxymethylpregnan-20-one in the procedure of Example 6 results in 3β,5α,6β-trihydroxy-6α-propionoxymethylpregnan-20-one.

EXAMPLE 8

To a solution of 5 parts of 6α-acetoxymethyl-3β,5α,6β-trihydroxypregnan-20-one in 80 parts of acetone is added, at about 10°, 5 parts by volume of an aqueous solution, 8 N in chromium trioxide and 8 N in sulfuric acid. The resulting reaction mixture is stirred for about 8 minutes, at the end of which time the excess reagent is destroyed by the addition of 8 parts of isopropyl alcohol. Dilution of the mixture with water followed by distillation of the organic solvent under reduced pressure results in precipitation of the solid product. That product is collected by filtration, washed with water on the filter and purified by recrystallization from aqueous acetone to yield 6α-acetoxymethyl - 5α,6β - dihydroxypregnane - 3,20-dione. This compound melts at about 222–224° and exhibits infrared absorption peaks at about 3.8, 3.92, 5.7, 5.76 and 5.81 microns and also nuclear magnetic resonance peaks at about 41, 84, 137 and 250 cycles per second. It is represented by the following structural formula:

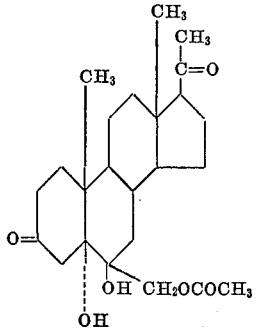

EXAMPLE 9

By substituting an equivalent quantity of 3β,5α,6β-trihydroxy-6α-propionoxymethylpregnan-20-one and otherwise proceeding according to the processes described in Example 8, there is produced 5α,6β-dihydroxy-6α-propionoxymethylpregnane-3,20-dione.

EXAMPLE 10

To a solution of 3.1 parts of 6α - acetoxymethyl-3β,5α,6β-trihydroxypregnan-20-one in 80 parts of methanol is added 3 parts by volume of 15% isopropanolic hydrogen chloride and the resulting reaction mixture is allowed to stand at room temperature for about 16 hours. At the end of that time the organic solvent is removed by distillation under reduced pressure and the residual mixture is diluted with water. The semi-solid product thus obtained is collected by filtration, then dried and recrystallized from chloroform-ethyl acetate to yield 3β,5α,6β-trihydroxy-6α-hydroxymethylpregnan - 20 - one, characterized by infrared absorption maxima at about 2.91 and 5.88 microns and also nuclear magnetic resonance peaks at about 38, 88, 122.5, 225, 235, 253 and 263 cycles per second. This compound is represented by the following structural formula:

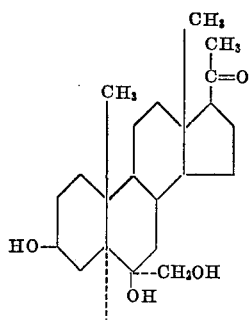

What is claimed is:
1. A compound of the formula:

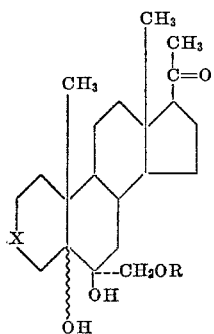

wherein X is selected from the group consisting of carbonyl, β-hydroxymethylene and β-benzyloxymethylene radicals and R is a member of the class consisting of hydrogen and lower alkanoyl radicals.

2. As in claim 1, a compound of the formula:

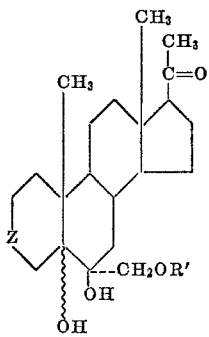

wherein Z is selected from the group consisting of carbonyl and β-hydroxymethylene radicals and R' is a lower alkanoyl radical.

3. As in claim 1, a compound of the formula:

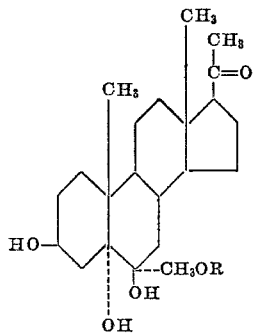

wherein R is a member of the class consisting of hydrogen and lower alkanoyl radicals.

4. A compound according to claim 1, wherein X is β-benzyloxymethylene and R is acetyl, that compound being 6α-acetoxymethyl-3β-benzyloxy - 5α,6β - dihydroxypregnan-20-one.

5. A compound according to claim 1, wherein X is β-hydroxymethylene and R is acetyl, that compound being 6α-acetoxymethyl-3β,5α,6β-trihydroxypregnan-20-one.

6. A compound according to claim 1, wherein X is carbonyl and R is acetyl, that compound being 6α-acetoxymethyl-5α,6β-dihydroxypregnane-3,20-dione.

7. A compound according to claim 1, wherein X is β-hydroxymethylene and R is hydrogen, that compound being 6α-hydroxymethyl - 3β,5α,6β - trihydroxypregnan-20-one.

8. A compound of the formula:

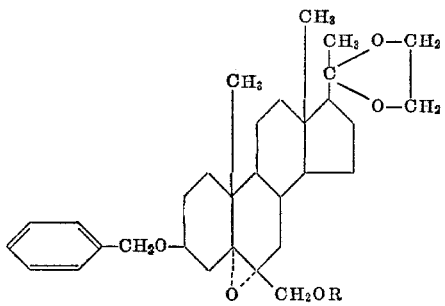

wherein R is selected from the group consisting of hydrogen and lower alkanoyl radicals.

9. A compound according to claim 8, wherein R is hydrogen, that compound being 3β - benzyloxy-5α,6α-epoxy-6β-hydroxymethylpregnan - 20 - one 20-ethylene ketal.

10. A compound according to claim 8, wherein R is acetyl, that compound being 6β-acetoxymethyl-3β-benzyloxy-5α,6α-epoxypregnan-20-one 20-ethylene ketal.

References Cited

Graber et al., Journ. Org. Chem., vol. 27, July 1962 pp. 2534–41.

LEWIS GOTTS, Primary Examiner

E. G. LOVE, Assistant Examiner

U.S. Cl. X.R.

260—397.4; 424—238, 243

UNITED STATES PATENT OFFICE
CERTIFICATE OF CORRECTION

Patent No. 3,509,137  Dated April 28, 1970

Inventor(s) Leonard N. Nysted

It is certified that error appears in the above-identified patent and that said Letters Patent are hereby corrected as shown below:

Column 7, first formula

" 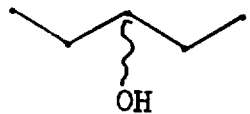 should be -- 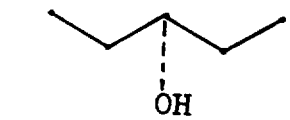 --.

Column 7, second formula

" 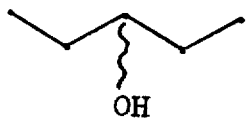 should be -- 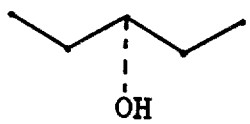 --.

SIGNED AND SEALED

AUG 25 1970

(SEAL)
Attest:

Edward M. Fletcher, Jr.
Attesting Officer

WILLIAM E. SCHUYLER, JR.
Commissioner of Patents